(12) United States Patent
Cheng et al.

(10) Patent No.: US 8,642,201 B2
(45) Date of Patent: Feb. 4, 2014

(54) LIQUID-METAL NEGATIVE ELECTRODE FOR LITHIUM-ION BATTERIES

(75) Inventors: Yang T. Cheng, Troy, MI (US); Stephen J. Harris, Bloomfield, MI (US); Adam T Timmons, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 13/071,948

(22) Filed: Mar. 25, 2011

(65) Prior Publication Data

US 2012/0244418 A1   Sep. 27, 2012

(51) Int. Cl.
*H01M 10/39* (2006.01)

(52) U.S. Cl.
USPC ............................................. 429/102; 429/103

(58) Field of Classification Search
USPC .................................................... 429/102, 103
See application file for complete search history.

(56) References Cited

U.S. PATENT DOCUMENTS

| | | | | | |
|---|---|---|---|---|---|
| 3,245,836 | A | * | 4/1966 | Agruss ...................... | 429/103 X |
| 4,065,602 | A | * | 12/1977 | Roche et al. ............. | 429/103 X |
| 4,495,258 | A | * | 1/1985 | Le Mehaute et al. ......... | 429/103 |
| 4,950,560 | A | * | 8/1990 | Tarcy ........................ | 429/103 X |
| 4,965,146 | A | * | 10/1990 | McCullough et al. ........ | 429/102 |
| 2011/0171510 | A1 | * | 7/2011 | Suzuki et al. ................. | 429/101 |

* cited by examiner

*Primary Examiner* — Stephen J. Kalafut
(74) *Attorney, Agent, or Firm* — BrooksGroup

(57) ABSTRACT

One embodiment includes a liquid-metal alloy negative electrode for a lithium-ion battery. The electrode may also include a porous matrix that comprises a polymer matrix material, a hydrogel material, or a ceramic material.

19 Claims, 4 Drawing Sheets

US 8,642,201 B2

LIQUID-METAL NEGATIVE ELECTRODE FOR LITHIUM-ION BATTERIES

TECHNICAL FIELD

The field to which the disclosure relates includes lithium-ion batteries.

BACKGROUND

Lithium-ion batteries are a type of rechargeable battery in which a lithium-ion moves between a negative electrode and a positive electrode. Lithium-ion batteries are commonly used in consumer electronics. In addition to uses for consumer electronics, lithium-ion batteries are growing in popularity for defense, automotive and aerospace applications because of their high energy density.

The process of lithium-ion insertion and extraction results in a large volume expansion and contraction in some negative electrodes. This expansion and contraction can approach three hundred percent, which may make the negative electrodes prone to cracking as the battery cycles between charging and discharging.

SUMMARY OF EXEMPLARY EMBODIMENTS OF THE INVENTION

One exemplary embodiment includes a liquid-metal alloy negative electrode layer for a lithium-ion battery. Because the alloy component of the negative electrode layer is in a liquid state, cracks typically caused by volume changes associated with lithium insertion and extraction in conventional solid metal negative electrodes can be eliminated.

Other exemplary embodiments will become apparent from the detailed description provided hereinafter. It should be understood that the detailed description and specific examples, while disclosing exemplary embodiments, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

The exemplary embodiments disclosed herein provide a negative electrode that may be formed of materials that may be used in a lithium-ion battery system. Moreover, the composition of the negative electrode is such that alloy component is liquid at the battery operating temperature (i.e. its melting point is below the battery operating temperature).

Figure 1:
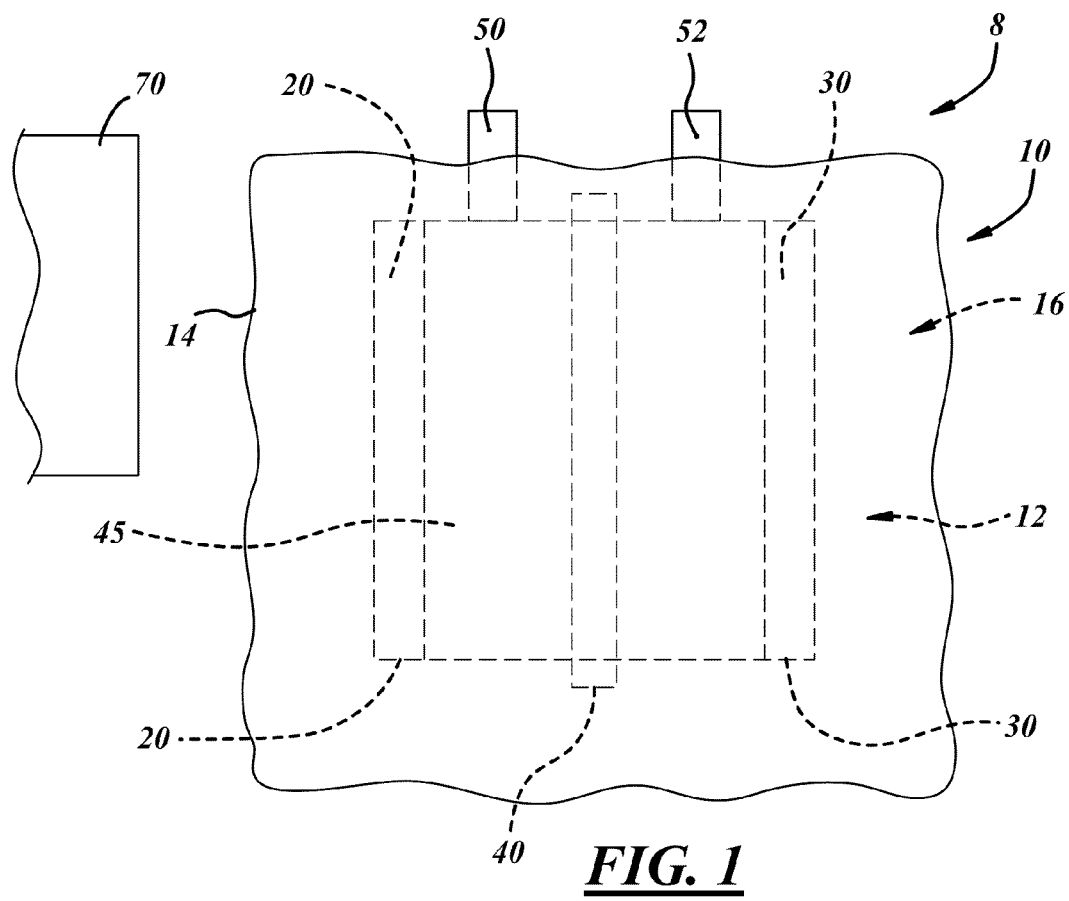
FIG. 1 is a schematic illustration of a cell enclosure-type lithium-ion battery including a negative electrode layer according to an exemplary embodiment.

FIG. 1 illustrates a top plan view of a product 8 having a lithium-ion battery 10 according to an exemplary embodiment. The product 8 may be used in automotive applications having an electrode assembly 12 and a cell enclosure 14, which may be formed with an interior region 16 for receiving the electrode assembly 12. In other words, FIG. 1 illustrates a cell enclosure-type lithium-ion battery 10 having the aforementioned electrode assembly 12. The components of the electrode assembly 12 and cell enclosure 14 are illustrative of the basic components and not intended to be depicted in proper orientation or scale.

The electrode assembly 12 may include a first electrode layer 20, a second electrode layer 30, and a separator 40 arranged between the first and second electrode layers 20 and 30 to prevent a short circuit between the first and second electrode layers 20 and 30 and allowing only lithium-ions to pass through it. The electrode assembly 12 may be formed by winding the first electrode layer 20, the separator 40, and the second electrode layer 30 into a jelly roll type structure. Alternatively, in another exemplary embodiment (not shown), the first electrode layer 20, the separator 40, and the second electrode layer 30 may be sequentially laminated into a stack structure.

FIG. 1 shows that the first electrode layer 20 is a positive electrode 20, while the second electrode layer 30 is a negative electrode 30. For ease of description, the first electrode layer 20 may be used interchangeably hereinafter as the positive electrode 20, while the second electrode layer 30 may be used interchangeably as the negative electrode 30. A liquid electrolyte 45 is also introduced within the interior region 16 of the cell enclosure 14 prior to the cell enclosure 14 being sealed.

A positive tab 50 and a negative tab 52 electrically connected to the respective electrode layers 20, 30 of the electrode assembly 10 may be installed such that a predetermined length of them may be exposed outside the case cell enclosure 14 as positive and negative terminals for electrical connection, respectively. Portions of the electrode tabs 50 and 52 that come in contact with the case cell enclosure 14 may be wrapped with an insulating material (not shown).

The positive electrode 20 may be formed by coating a strip shaped metal layer such as aluminum foil with a positive active material. The positive active material may be formed from one or more of several materials including but not limited to $LiFePO_4$ or $LiMnO_2$. The positive electrode 20 may be electrically connected to the positive tab 52 and wrapped with insulating material (not shown).

Figure 2:
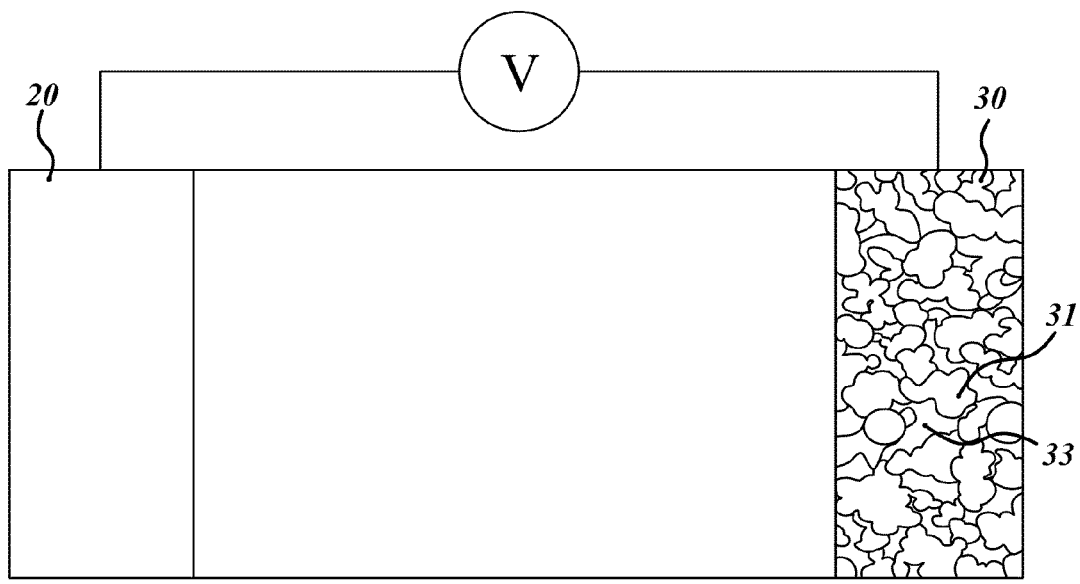
FIG. 2 is a close-up schematic illustration of one of the negative electrode layers of FIG. 1.

FIG. 2 shows the negative electrode 30 for use in the device 8 of FIG. 1, which may be formed from a liquid metal alloy 31 absorbed in a porous matrix 33 made of polymers, hydro-gels or ceramics. The negative electrode 30 may be formed of various geometries to match or differ from the negative electrode 30, including in shapes such as layers, disks or cylinders. In FIGS. 1 and 2, for example, the negative electrode 30 is formed as a plate.

A separator layer 40 may be made of a polyethylene film, a polypropylene film or a combination thereof. The separator 40 may be formed to be wider than the negative and positive layers 20 and 30 to prevent a short circuit between the negative and positive layers 20 and 30. Instead of a separator layer 40 and a liquid electrolyte 45, it may be possible to use a solid electrolyte (not shown) composed of LiPON or LISICON or an appropriate lithium salt dispersed in PEO. Whether a separator layer 40 or a solid electrolyte layer as the intermediate layer between the positive electrode 20 and the liquid negative electrode is utilized, the intermediate layer will have to incorporated in the device 8 in such a way as to create an isolated region around each negative electrode 30 in order to prevent migration of the liquid metal alloy negative electrode 30 away from the negative electrode's substrate/current collector.

The liquid electrolyte 45 may include lithium salts such as $LIPF_6$, $LIBF_4$, or $LIClO_4$, and organic solvents such as a mixture of linear and cyclic organic carbonates. The liquid electrolyte 45 conducts lithium-ions, which acts as a carrier between the negative electrode 30 and the positive electrode 20 when the battery 10 passes an electric current through an external circuit.

The cell enclosure 14 may be formed from a wide variety of materials that are either rigid and mechanically sealable or flexible and heat sealable such that no oxygen or water vapor may enter. The cell enclosure 14 may be a pouch-type cell enclosure made of laminate material consisting of layered aluminum and plastic.

Both the positive electrode 20 and negative electrode 30 are materials with which lithium-ions can react. When a cell is discharging, the lithium-ions leave the negative electrode 30 and react with the positive electrode 20. When the cell is charging, the lithium-ions are extracted from the positive electrode 20 and inserted into the negative electrode 30.

In one specific exemplary embodiment, the negative electrode 30 may be formed of low melting point alloys that react with lithium such as M where M is a metal alloyed to Sn and including one or more of Bi, Ga and In. The liquid metal alloys 31 can be absorbed in a porous matrix 33 made of porous metals, polymers, hydro-gels, or ceramics to form negative electrodes 30 of various geometries, including disks, plates (see FIGS. 1 and 2 as 30) and cylinders. By properly alloying elements of Tin, Bismuth, Gallium and Indium, the melting point of the alloy component of the negative electrode 30 can be lowered to below the operating temperature of a battery system 8 (i.e. the alloy will be liquid at operating temperature).

Elements that have been identified as having the ability to react with a large amount of lithium and potentially available for use as a portion of a negative electrode 30 include Tin (Sn), Bismuth (Bi), Gallium (Ga) and Indium (In). However, each of these elements alone has relatively high melting points of above 150 degrees Celsius. However, as will be discussed below, alloys of these elements may have sufficiently low melting points to be liquid at the battery system operating temperature.

Figure 3A:
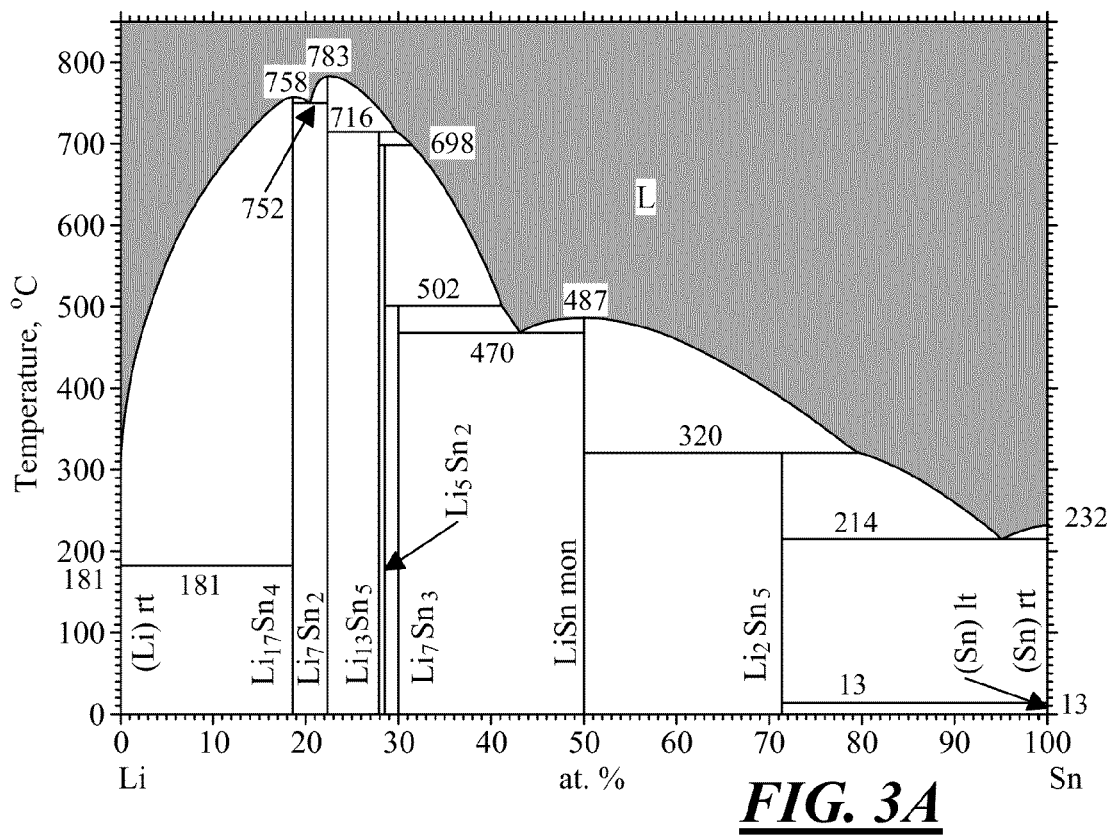
FIG. 3A is a binary phase diagram of a Li—Sn system.
Figure 3B:
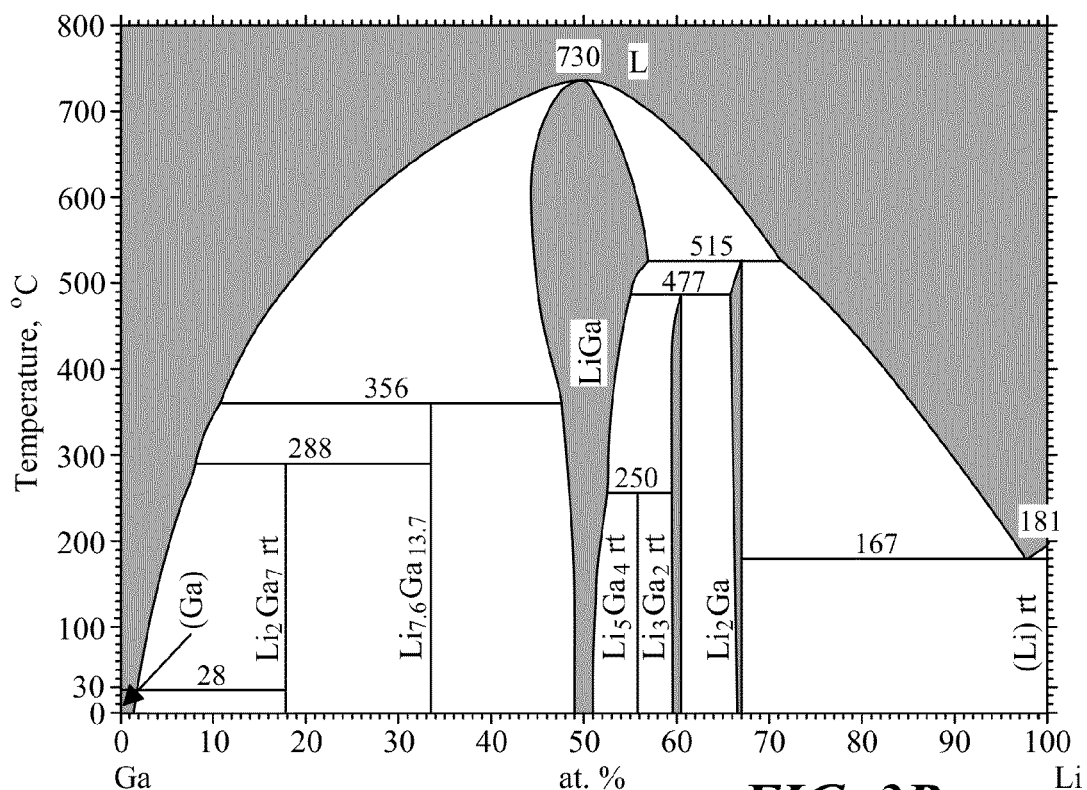
FIG. 3B is a binary phase diagram of a Li—Ga system.
Figure 3C:
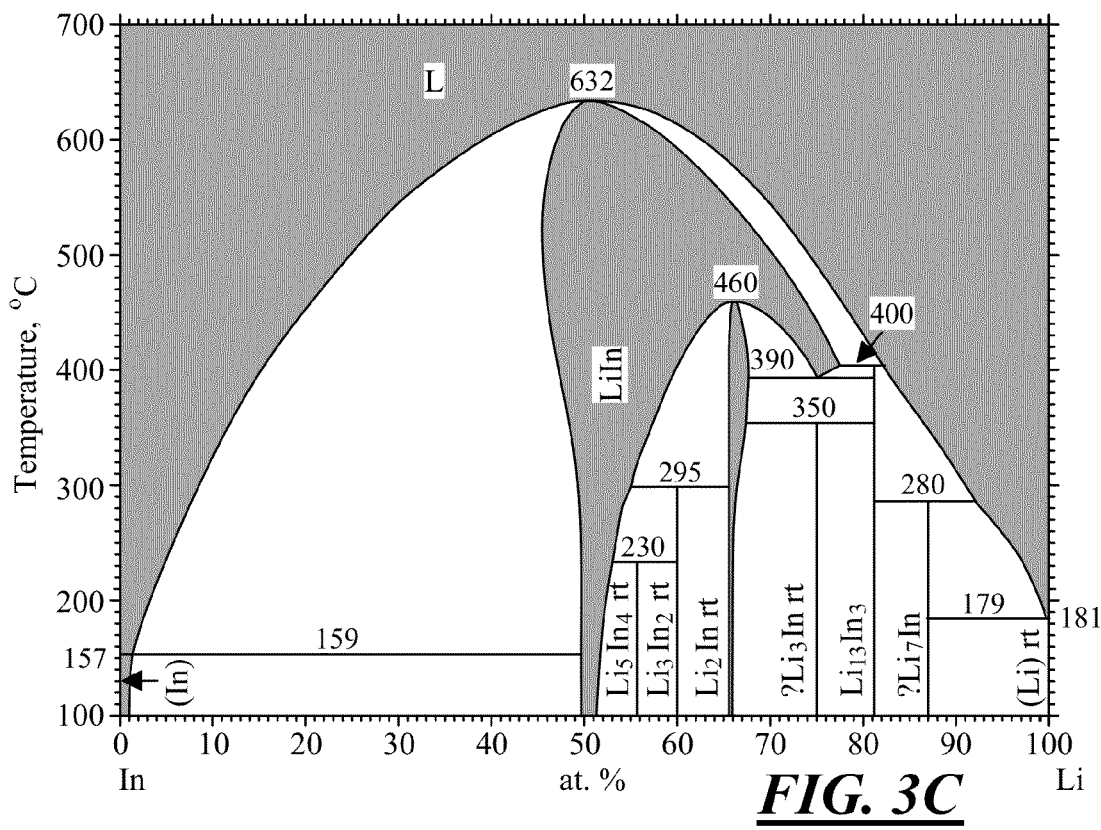
FIG. 3C is a binary phase diagram of a Li—In system.
Figure 4A:
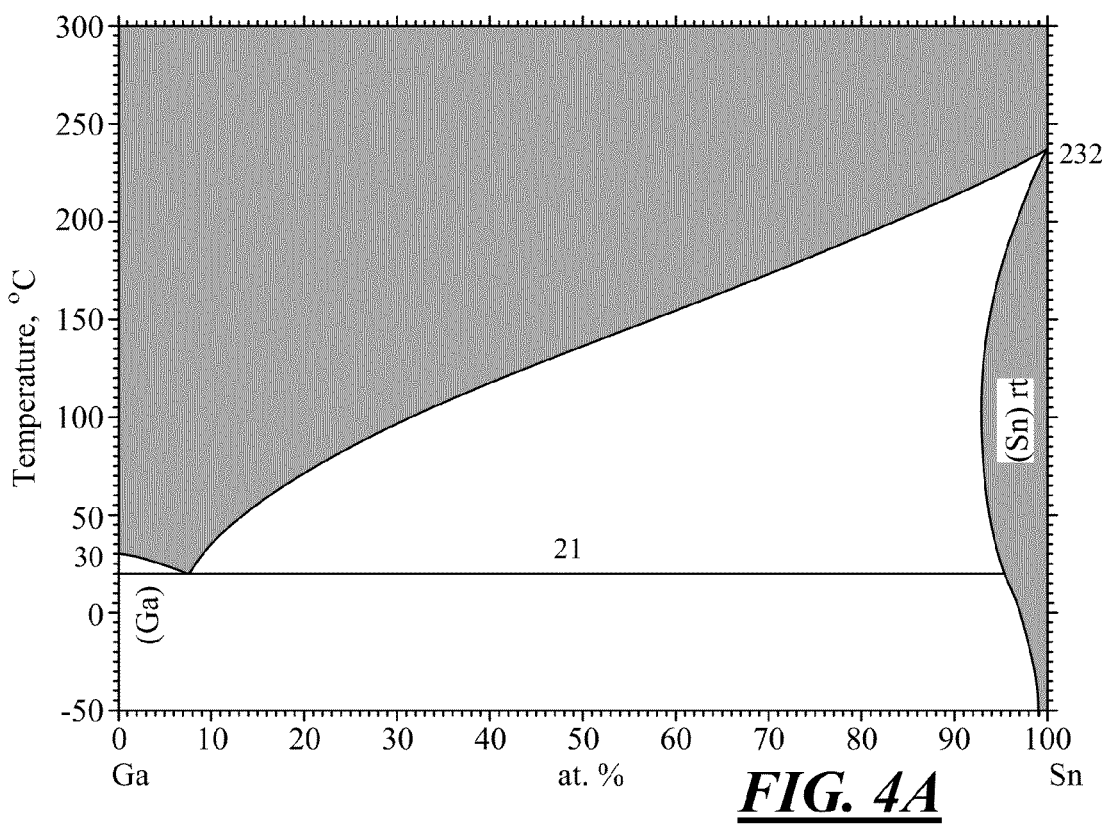
FIG. 4A is a binary phase diagram of a Ga—Sn system.

To determine which alloys may be available, it may be useful to review the binary phase diagrams for various alloy systems to determine the melting points and eutectic points for each of the possible alloy combinations. FIGS. 3A, 3B and 3C illustrate binary phase diagrams for a Li—Sn alloy system, a Li—Ga alloy system, and a Li—In alloy system. FIG. 4A illustrates a binary phase diagram for a Ga—Sn alloy system.

Figure 4B:
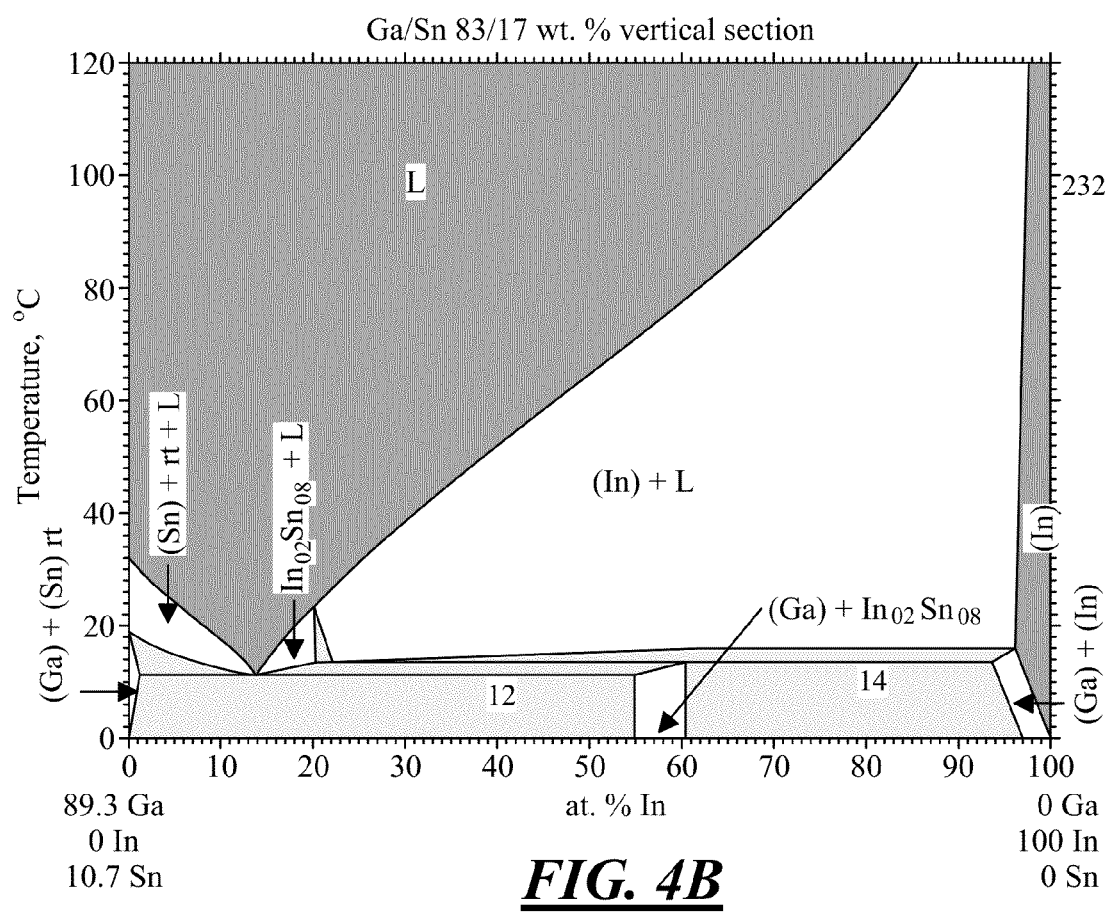
FIG. 4B is a pseudo-binary phase diagram of a Ga—Sn—In alloy system.

Finally, FIG. 4B illustrates a pseudo binary-phase diagram for a Ga (89.3 weight percent)-Sn (10.7 weight percent)-In alloy system.

A eutectic or eutectic mixture, for the purposes herein, is defined as a mixture of two or more metals at such proportions that the melting point is as low as possible, and that furthermore all the constituents crystallize simultaneously at this temperature from molten liquid solution. Such a simultaneous crystallization of a eutectic mixture is known as a eutectic transition, the temperature at which it takes place is the eutectic temperature, and the composition and temperature at which this takes place is the eutectic point.

As FIGS. 3A, 3B and 3C illustrate, none of the proposed alloys of Li—Sn, Li—Ga or Li—In achieve eutectic points of room temperature. However, FIG. 4A illustrates that a eutectic point at 21 degrees Celsius may be achieved for an alloy comprising roughly 9% Ga and 91% Sn (by weight). Additionally, as FIG. 4B illustrates, a eutectic point at 12 degrees Celsius may be achieved for an alloy comprising roughly 89.3% Ga and 10.7% Sn (by weight). FIGS. 4A and 4B thus indicate that various alloys of a Sn—In—Bi—Ga system may be available for use as a negative electrode in lithium-ion battery systems desiring a negative electrode having the ability to react with a large amount of lithium and a relatively low melting point of below or about room temperature. These alloys may then be compared with various other attributes, including but not limited to the number of lithium atoms that react per atom of initial material, raw material cost, processability and other attributes to determine which specific alloys have the best combination of properties for a particular product or use.

One specific exemplary composition for the negative electrode 30 that may be derived from FIG. 4A is a liquid metal alloy composition of approximately 90 weight percent Ga and approximately 10 weight percent Sn. One specific exemplary composition for the negative electrode that may be derived from FIG. 4B is a liquid metal alloy composition of approximately 78.3 weight percent Ga, 9.7 weight percent Sn, and about 12 weight percent In.

The use of a liquid metal alloy negative electrode 30 as described herein does not suffer from cracking associated with volume expansion and contraction associated with use of a lithium-ion battery. As such, one may expect a product utilizing a liquid metal alloy negative electrode 30 as described herein to therefore achieve longer cycle lives.

The above description of embodiments of the invention is merely exemplary in nature and thus variations thereof are not to be regarded as a departure from the spirit and scope of the invention.

What is claimed is:

1. A negative electrode comprising:
   a porous matrix, wherein said porous matrix comprises a polymer matrix material, a hydro-gel material, or a ceramic material; and
   a liquid metal alloy material that reacts with lithium coupled within said porous matrix.

2. The negative electrode of claim 1, wherein said liquid metal alloy material that reacts with lithium comprises an alloy of at least two metals one of which is Sn, Bi, Ga or In.

3. The negative electrode of claim 1, wherein said liquid alloy material that reacts with lithium comprises alloys of at least two metals comprising Sn and at least one of Bi, Ga or In.

4. The negative electrode of claim 3, wherein said liquid metal alloy material that reacts with lithium comprises approximately 90 weight percent Ga and approximately 10 weight percent Sn.

5. The negative electrode of claim 3, wherein said liquid metal alloy material that reacts with lithium comprises approximately 78.3 weight percent Ga, approximately 9.7 weight percent Sn, and approximately 12 weight percent In.

6. An electrode assembly comprising:
   at least one positive electrode; and
   at least one negative electrode, said negative electrode comprising a liquid metal alloy material that reacts with lithium having a melting point below an operating temperature for an lithium-ion battery, the liquid metal alloy material coupled within a porous matrix, wherein said porous matrix comprises a polymer matrix material, a hydro-gel material, or a ceramic material.

7. The electrode assembly of claim 6, wherein said liquid metal alloy material that reacts with lithium comprises alloys of at least two metals comprising at least one of Sn, Bi, Ga or In.

8. The electrode assembly of claim 6, wherein said liquid metal alloy material that reacts with lithium comprises alloys of at least two metals comprising Sn and at least one of Bi, Ga or In.

9. The electrode assembly of claim 6, wherein said negative electrode further comprises a porous matrix.

10. The electrode assembly of claim 9, wherein said porous matrix comprises a polymer matrix, a hydro-gel material, or a ceramic material.

11. The electrode assembly of claim 6, wherein said liquid metal alloy material that reacts with lithium comprises approximately 90 weight percent Ga and approximately 10 weight percent Sn.

12. The electrode assembly of claim 6, wherein said liquid metal alloy material that reacts with lithium comprises approximately 78.3 weight percent Ga, approximately 9.7 weight percent Sn, and approximately 12 weight percent In.

13. A product comprising:
a positive electrode;
a negative electrode comprising a alloy material that reacts with lithium having a melting point below an operating temperature for the product and a porous matrix, wherein said porous matrix comprises a polymer matrix material, a hydro-gel material, or a ceramic material; and
a separator or solid electrolyte layer coupled between said negative electrode and said positive electrode.

14. The product of claim 13, wherein said liquid metal alloy material that reacts with lithium comprises alloys of at least two metals comprising Sn and at least one of Bi, Ga or In.

15. The product of claim 14, wherein said liquid metal alloy material that reacts with lithium comprises approximately 90 weight percent Ga and approximately 10 weight percent Sn.

16. The product of claim 14, wherein said liquid metal alloy material that reacts with lithium comprises approximately 78.3 weight percent Ga, approximately 9.7 weight percent Sn, and approximately 12 weight percent In.

17. The product of claim 13 further comprising:
a cell enclosure enclosing said negative electrode, said positive electrode, and said separator or solid electrolyte layer.

18. The product of claim 17 further comprising:
a liquid electrolyte contained within said cell enclosure.

19. The product of claim 17, wherein said cell enclosure comprises a pouch-type cell enclosure comprising a laminate material comprising aluminum and plastic.

* * * * *